Dec. 19, 1922.

J. F. ROBBIN.
LATHE.
FILED AUG. 4, 1920.

Witness:
Harold O. Van Antwerp

Inventor:
Joseph F. Robbin
By Cyrus W. Rice
His Attorney

J. F. ROBBIN.
LATHE.
FILED AUG. 4, 1920.

Witness:
Harold O. Van Antwerp

Inventor:
Joseph F. Robbin
By Cyrus W. Rice
his Attorney.

Dec. 19, 1922.

J. F. ROBBIN.
LATHE.
FILED AUG. 4, 1920.

Witness:
Harold O. Van Antwerp

Inventor:
Joseph F. Robbin
By Cyrus W. Rice
his Attorney.

Dec. 19, 1922.

J. F. ROBBIN.
LATHE.
FILED AUG. 4, 1920.

Witness:
Harold O. Van Antwerp

Inventor:
Joseph F. Robbin
By Cyrus W. Rice
his Attorney.

Dec. 19, 1922.

J. F. ROBBIN.
LATHE.
FILED AUG. 4, 1920.

Inventor:
Joseph F. Robbin.
By Cyrus W. Rice
his Attorney

Patented Dec. 19, 1922.

1,439,125

UNITED STATES PATENT OFFICE.

JOSEPH F. ROBBIN, OF GRAND RAPIDS, MICHIGAN.

LATHE.

Application filed August 4, 1920. Serial No. 401,093.

*To all whom it may concern:*

Be it known that I, JOSEPH F. ROBBIN, a citizen of the United States, residing at Grand Rapids, in the county of Kent and State of Michigan, have invented new and useful Improvements in Lathes, of which the following is a specification.

The present invention relates to lathes, and particularly to such as are employed for turning irregular bodies; and its object is, generally, to provide a lathe improved in various respects hereinafter appearing; and more particularly, to provide a lathe for turning irregular bodies, having a tool carrier so mounted as to readily move the tool into cutting engagement with the workpiece; and further, to provide a lathe of that character having such a carrier for a plurality of tools and so mounted as to move the tools uniformly into cutting engagement with the respective work pieces; and further, to provide such a lathe having a tool carrier and a tool so carried thereby as to be automatically moved nearer the work in one position of the mechanism than in a preceding position; and further, to provide a lathe of that character having improved means for reciprocating the lathe bed on the frame of the machine; and further, to provide such a lathe having improved means for rotating the tool; and further, to provide a lathe having improved means for interrelatively moving the live and the dead head stocks; and further, to provide improved work-holding means for the live head stock of a lathe; and further, to provide a lathe having a plurality of pairs of cooperating head stocks so arranged as to receive and hold the work-pieces in the same angular position in all the live head stocks; and further, to provide a lathe for turning irregular bodies, having improved counterbalancing means for the carrier of the tools.

These and any other objects hereinafter appearing are attained by, and the invention finds preferable embodiment in, the structure or structures particularly described in the body of this specification and illustrated by the accompanying drawings, in which:—

In the embodiment of the invention chosen for illustration by the drawings and for detailed description in the body of this specification, a lathe for simultaneously turning a plurality of irregular bodies, as the work pieces 1, is shown. The main frame 2 of the machine has horizontal tracks 3 at its opposite sides respectively, in which tracks the lathe bed, designated generally 4, has a reciprocating movement, being thus moved by means hereinafter described. This lathe bed comprises a portion 5, on which the live head stocks 6 of the lathe are journalled, and another portion 7 carrying the dead head stocks 8 and being slidably movable in the tracks 9 relatively to the body portion 5 in the direction of the head stocks' axes, in order to permit the insertion and removal of work-pieces between the live and dead head stocks and to adjust their position to work-pieces of different lengths. The central live head stock and the central dead head stock hold the work pattern 10 on whose upper surface the follower 11 rests by gravity while the work-pattern is being rotated by its live head stock. This follower is preferably in the form of a circular disk, as shown, freely rotatable at 12 on the follower's mounting member 13, which member is carried by a carrier 14 pivoted at 15 adjacent its rear end to the frame 2. This carrier 14 carries the cutting tools 16 rotatably mounted thereon at 17. It will be seen that inasmuch as the carrier 14 is pivotally mounted instead of being guided in slide bearings, it is much more readily movable toward and away from the work-pieces under the governing action of the follower, not being subject to the sticking or binding action incident to slide bearings, especially where the sides of such a bearing are far apart relatively to the length of the guided and guiding parts of the bearing. It will also be seen that inasmuch as the axis of the carrier's pivotal mounting 15 intersects the axes of the shafts 18 of the tools, there is slight variation (or none whatever) in the stress or strain to which the tools' driving means—as their belts 19, carried by the shafts' pulleys 20—are subjected in any position of the carrier. The lathe bed is reciprocated transversely to the cutting path of the rotating tools, in order to move the work-pieces longitudinally through the zone of the tools' action, by the following mechanism: The shafts 21 journalled at 22 on the opposite sides of the frame 2 are threaded in the nuts 23 carried by the lathe bed. By providing this pair of shafts—one at either side of the machine—it will be seen that the lathe bed is moved in the tracks 3 with uniform speed at both its sides and is thus prevented from sticking or binding in its travel.

In the illustrated construction, these threaded shafts 21 are rotated in one direction or the other to move the lathe bed forwardly or rearwardly, from the same source of power and by the same moving part that effects the rotation of the cutting tools, viz., the main shaft 24 carrying the pulleys 25 on which and on the pulleys 20 are carried the belts 19. This main shaft 24 carries also the pulley 26, a belt 27 being carried thereby and by the pulley 28 whose shaft 29 has a worm 30 meshing with the worm wheel 31 on the shaft 32 carrying gears 33, 34, one of which, 33, meshes with a gear 35 and the other, 34, meshes with an intermediate gear 36 which meshes with a gear 37 on the same shaft 38 which carries the gear 35. These two gears 35, 37 turn freely on their shaft 38 and have clutch members 39, 40 respectively. The clutch member 41 in splined relation to said shaft 38 may be slid into clutching engagement with either of the clutch members 39 or 40, and when in engagement with one of them the shaft 38 is caused to rotate in one direction but when in engagement with the other this shaft is caused to rotate in the opposite direction. Said shaft 38 has sprocket wheels 42, 43 on which and on the sprocket wheels 44, 45 are carried the sprocket chains 46, 47, for rotating the threaded shafts 21 on which the sprocket wheels 44, 45 are respectively carried. Clutch members of any suitable form may be employed, toothed clutch members being preferably in lathes for turning heavy work.

The movable clutch member 41 is automatically slid on its shaft 38 into one or the other of its operative positions by its fork 48 to which is attached the rod 49 pivoted at 50 to a lever arm 51 fulcrumed at 52 on the frame 2.

Figures 18, 19, 20:
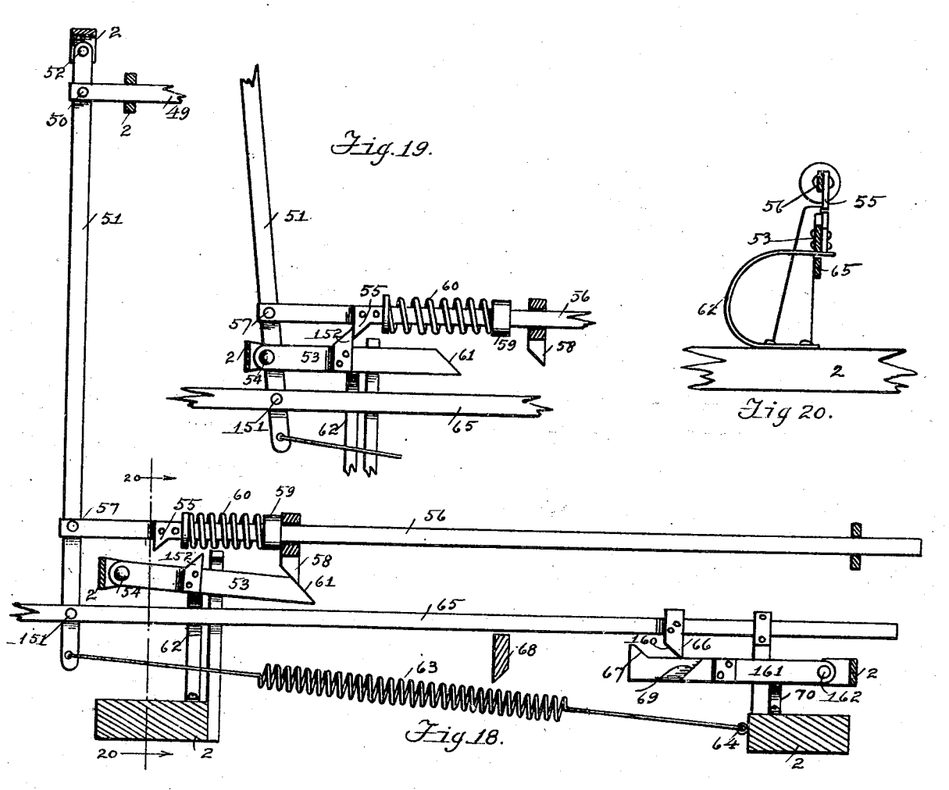
Figure 18 is a top plan view of means for controlling the reciprocating movement of the lathe bed.
Figure 19 is a like view of parts of the same, showing such parts in another position.
Figure 20 is a transverse sectional view of parts of said means taken on a plane corresponding to line 20—20 of Figure 18.
Figures 25, 26, 27:
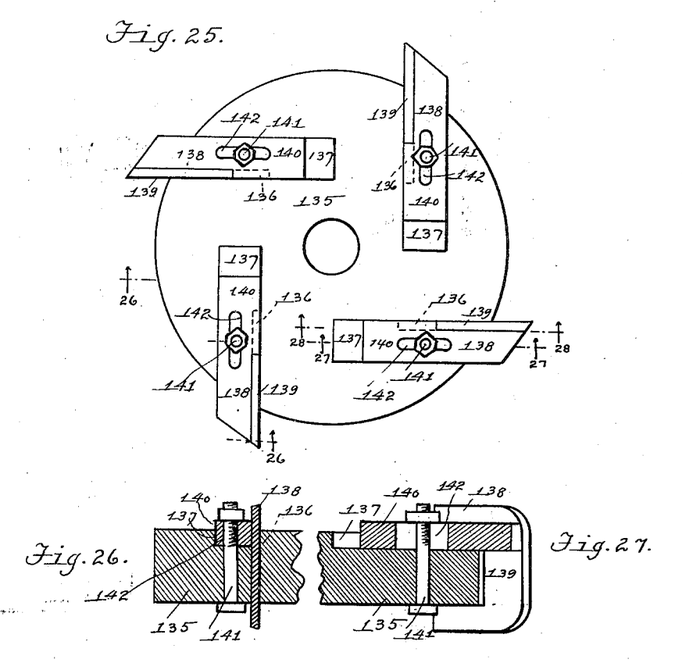
Figure 25 is a face view of a tool-carrying rotatable head.
Figures 26, 27 and 28 are sectional views of the same taken on planes corresponding to lines 26—26, 27—27 and 28—28, respectively of Figure 25.
Figure 28:
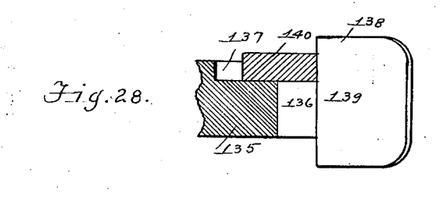

Assuming now that the parts are in the position shown in Figure 18 in which the movable clutch member 41 is in neutral position engaging neither of the clutch members 39, 40: If the hand-operated lever 71 (Figure 1) is swung forwardly the rod 65 connected thereto at 150 and to the lever 51 at 151 is shifted forwardly with the following effect: The bevelled edge 160 of the lug 66 engages the like edge of the lug 67 of the catch 161 pivoted at 162 on the frame and swings said catch against the pressure of its spring 70, whereupon the rear face of the lug 66 engages the front face of the lug 67 thus holding the parts in forward position wherein the lever 51 has shifted the rod 49 forwardly causing the clutch member 41 to engage the clutch member 39 to move the lathe bed rearwardly, the spring 63 attached to the lever 51 and at 64 to the frame being brought under tension by this forward movement of the hand lever 71. As the lathe bed approaches the limit of its rearward movement, the releasing member 68 carried by the lathe bed engages the bevelled edge 69 of the catch 161 and swings it to release the lug 66, whereupon the spring 63 swings the lever 51 and rods 49, 56 rearwardly thus causing the clutch member 41 to engage the clutch member 40 to move the lathe bed forwardly; the same movement causes the lug 55 to engage the lug 152 of the catch 53, pivoted at 54 on the frame, and thereupon engage the opposite side of the lug 152 as seen in Figure 19, whereby the parts are held in that position in which the lathe bed is moved forwardly. As the lathe bed nears the limit of its forward movement, the releasing member 58 carried thereby engages the collar 59 slidable on the rod 56 and thereby tensions the spring 60, and continuing in its movement engages the bevelled edge 61 of the catch 53 and swings it to release the lug 55, whereupon the spring 60 overcomes the weaker spring 63 and swings the lever 51 forwardly.

Figure 8:
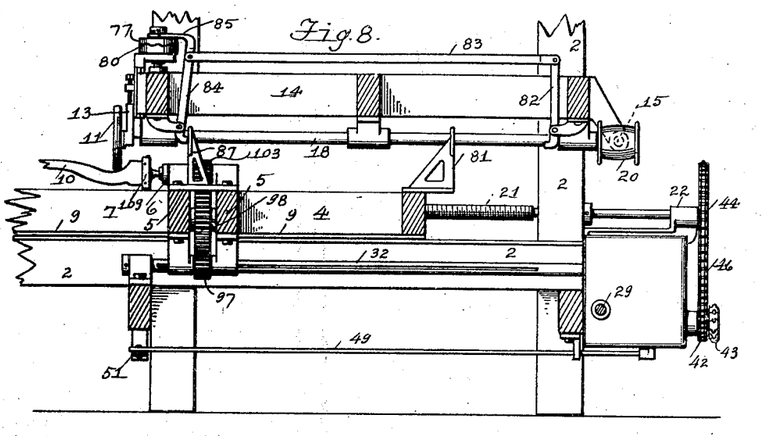
Figure 8 is a sectional view of certain parts of the lathe taken on a vertical plane corresponding to line 8—8 of Figure 4.
Figures 9, 10, 11, 12, 13, 14, 15:
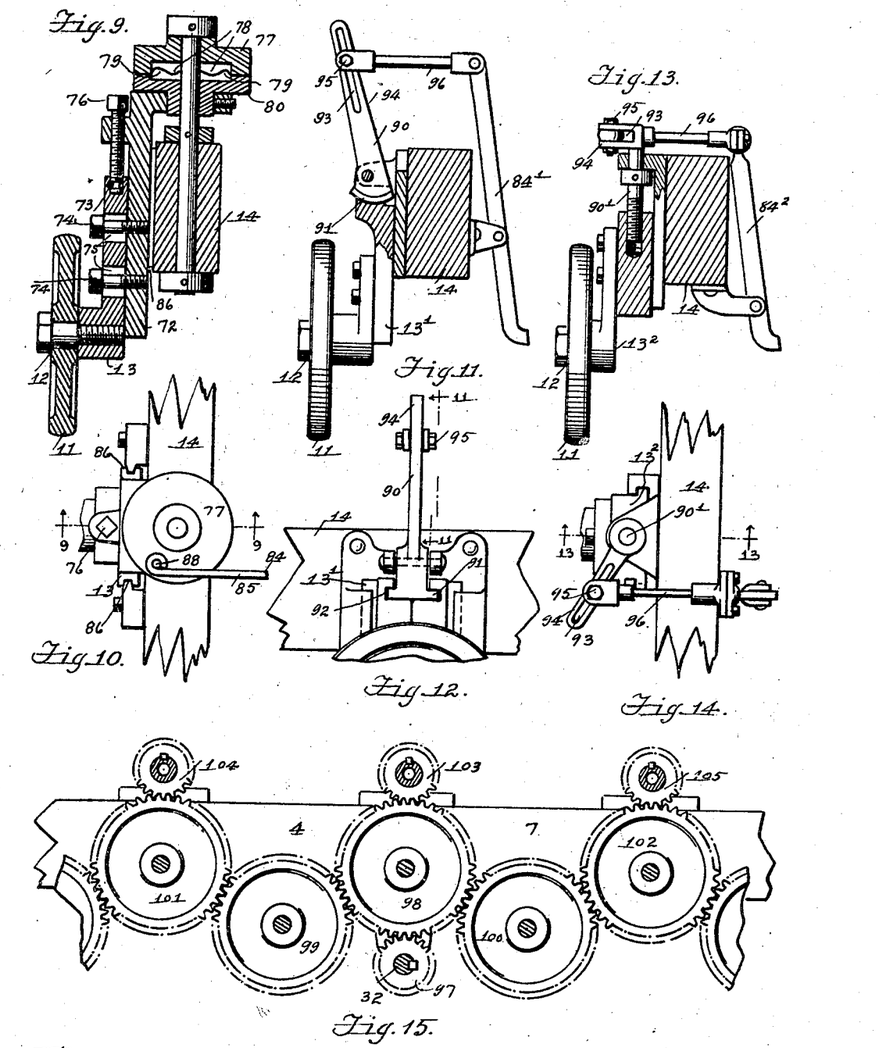
Figure 9 is a longitudinal sectional view of a means for supporting and moving the work-pattern on the tool carrier, taken on a vertical plane corresponding to line 9—9 of Figure 10.
Figure 10 is a top plan view of the same.
Figure 11 is a longitudinal sectional view of a modified form of such means taken on a vertical plane corresponding to line 11—11 of Figure 12.
Figure 12 is a top plan view of the same.
Figure 13 is a view of another modified form of such means, certain parts being shown in vertical section taken on a plane corresponding to line 13—13 of Figure 14.
Figure 14 is a top plan view of the same.
Figure 15 is a view of gearing for rotating the live head stocks of the lathe, the shafting being sectioned on a vertical plane corresponding to line 15—15 of Figure 4.

In order that the work-pieces may be cut to a certain degree during the lathe bed's travel in one direction and to an increased degree during its travel in the opposite direction, means are provided for moving the follower 11 relatively to the carrier 14 in a direction transverse to the head stocks' axis, such means being automatically operable at a position of the lathe bed adjacent the end of its movement. Several forms of such means are shown in Figure 8, in Figures 9 and 10, in Figures 11 and 12, and in Figures 13 and 14 respectively. In Figures 9 and 10, the follower including its mounting member 13 is vertically slidably mounted at 86 on the carrier 14 in the following manner: The body portion 72 of the follower's mounting member carries another portion 73 thereof, in vertically adjustable relation, by the bolts 74 passing through vertical slots 75 in the portion 73 and threaded in the other portion 72, a screw 76 serving to nicely adjust the position of the portions 72 and 73 before the clamping bolts 74 are screwed down. The portion 72 of the mounting member of the follower is raised relatively to the carrier by turning the cam head 77 a few degrees whereby its cams 78 are caused to ride up on the cams 79 of the stationary cam head 80 carried by the carrier 14. The cam head 77 is thus turned to raise the follower by the lug 81 (see Figure 8) on the lathe bed which lug is carried, by the lathe bed when approaching the limit of its rearward movement, into engagement with the lever 82 fulcrumed on the carrier, the connecting rod 83 thus swinging the lever 84 fulcrumed on the carrier and causing its upper portion 85, pivoted at 88 eccentrically on the cam head 77, to turn this cam head and raise the follower. When the lathe bed approaches the limit of its forward movement, its lug 87 engages the lever 84 and moves it to turn the cam head 77 in the other direction, thus lowering the follower. It will be seen that in the forward movement of the lathe bed the work-pieces are cut deeper than in its rearward movement.

Figures 16, 17:
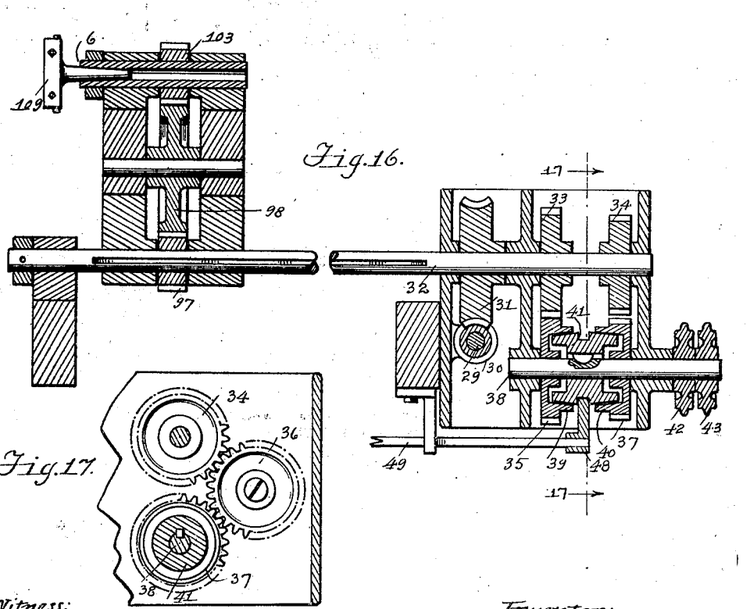
Figure 16 is a longitudinal axially sectional view of driving means taken on a vertical plane.
Figure 17 is a transverse sectional view of a portion thereof taken on a vertical plane corresponding to line 17—17 of Figure 16.

In Figures 11 and 12 the mounting member $13^1$ of the follower is vertically moved by a turnable member, the lever arm 90 fulcrumed on the carrier and having a cam 91 engaging in a groove 92 in the mounting member of the follower to raise and lower the same; and in Figures 13 and 14 the turnable member $90^1$ is journalled on the carrier and threaded in the mounting member $13^2$ of the follower. These turnable members 90, $90^1$ are turned by the levers $84^1$, $84^2$ respectively, operated in the same manner as is the lever 84 particularly shown in Figure 8. In Figures 11 and 12 and in Figures 13 and 14 means for adjusting the extent of the follower's movement relatively to the carrier are shown, comprising a slot 93 extending longitudinally in the turnable member's lever arm 94 in which slot the pivotal connection 95 of the rod 96 may be adjustably fixed. The shaft 32 is in splined relation to means carried by the lathe bed for rotating the live head stocks. Such means in the construction shown in Figures 15 and 16 comprises the gear 97 splined on the shaft 32 and meshing with the gear 98 which meshes with the gears 99, 100, meshing respectively with the gears 101, 102. The gears 98, 101, 102 mesh with the gears 103, 104 and 105 respectively on the several live head stocks. The like gear ratios between gears driving the several live head stocks being provided, all the live head stocks rotate at the same speed, and each may carry work-holding means or chucks in which the work-pattern and all the work-pieces are held in the same angular position. In order that the work-pattern and the work-pieces to be conformed thereto by the turning process may all be received and held by the live head stocks (rotating at the same speed) in the same predetermined angular positions relatively to the live head stocks whereby they are respectively carried, work-piece holding means are provided for the live head stocks, disposed thereon in the same angular position about the live head stocks' axes.

Figures 1, 21, 22, 23, 24:
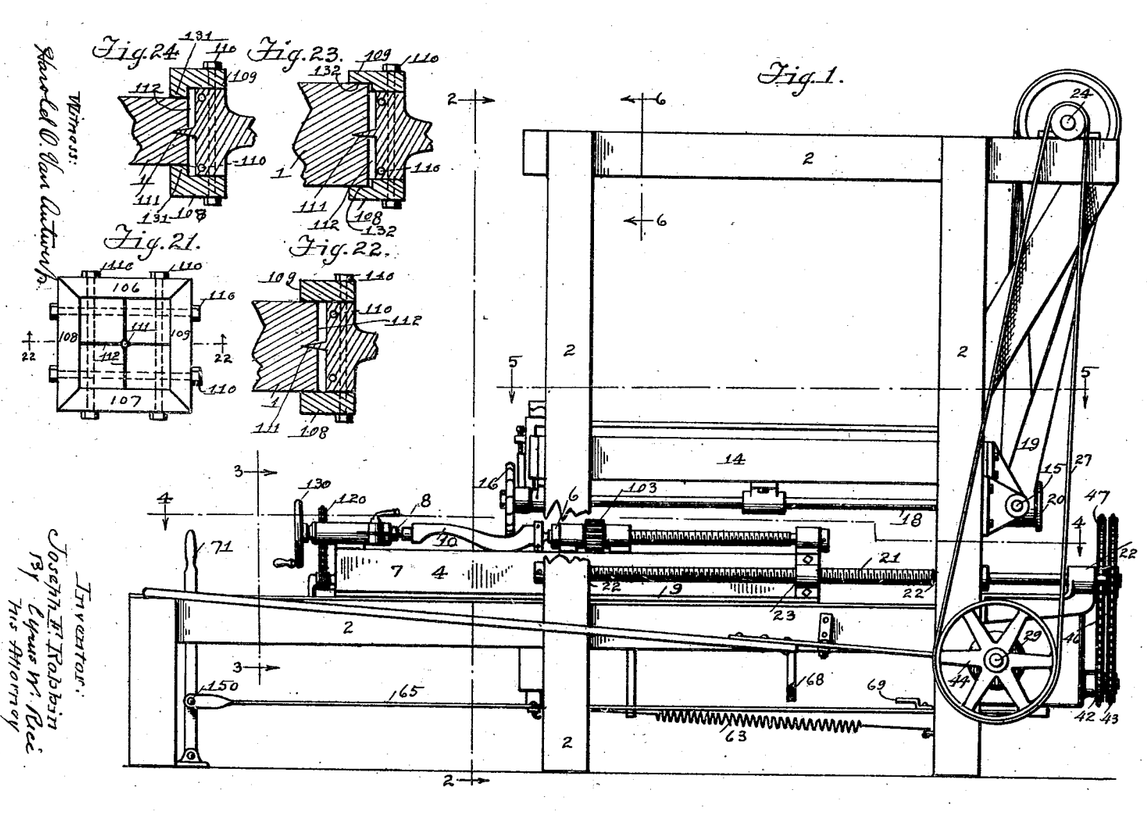
Figure 1 is a right hand side view of a lathe.
Figure 21 is a front view of means for receiving and holding a work-piece on the lathe's live head stock.
Figure 22 is a longitudinal sectional view of the same taken on a plane corresponding to line 22—22 of Figure 21.
Figures 23 and 24 are like views but showing, respectively, modified constructions of said means.
Figure 2:
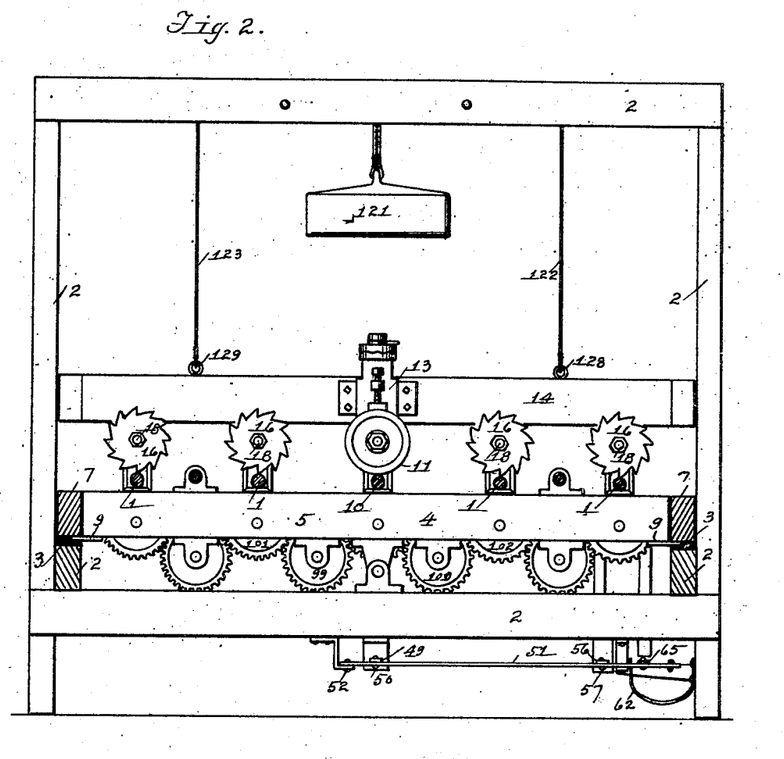
Figure 2 is a transverse sectional view of the same taken on a vertical plane corresponding to line 2—2 of Figure 1.

In Figures 21, 22, 23 and 24 such workholding means comprises oppositely disposed members 106, 107 and like members 108, 109, the squared ends of a work-pattern or of a work-piece being received therebetween. These members are detachably secured to the live head stock by bolts 110. In Figure 24 the oppositely disposed members 108, 109 and also 106, 107 (not shown) have inwardly extending ribs 131; and in Figure 23 such members have rabbets 132, so that work-pieces of different cross sectional dimensions may be received and held thereby. The head stock has also the central pointed spur 111 and radially extending spurs 112 adapted to be forced into the end of the work-pattern or work-piece.

Figure 3:
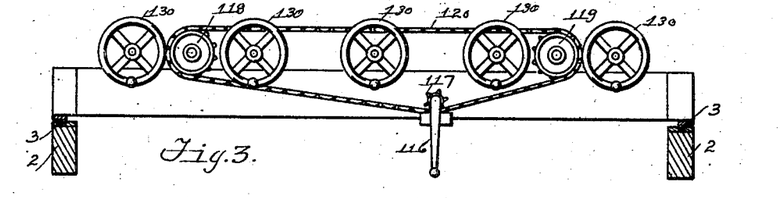
Figure 3 is a like view of certain parts of the lathe taken on a vertical plane corresponding to line 3—3 of Figure 1.
Figure 4:
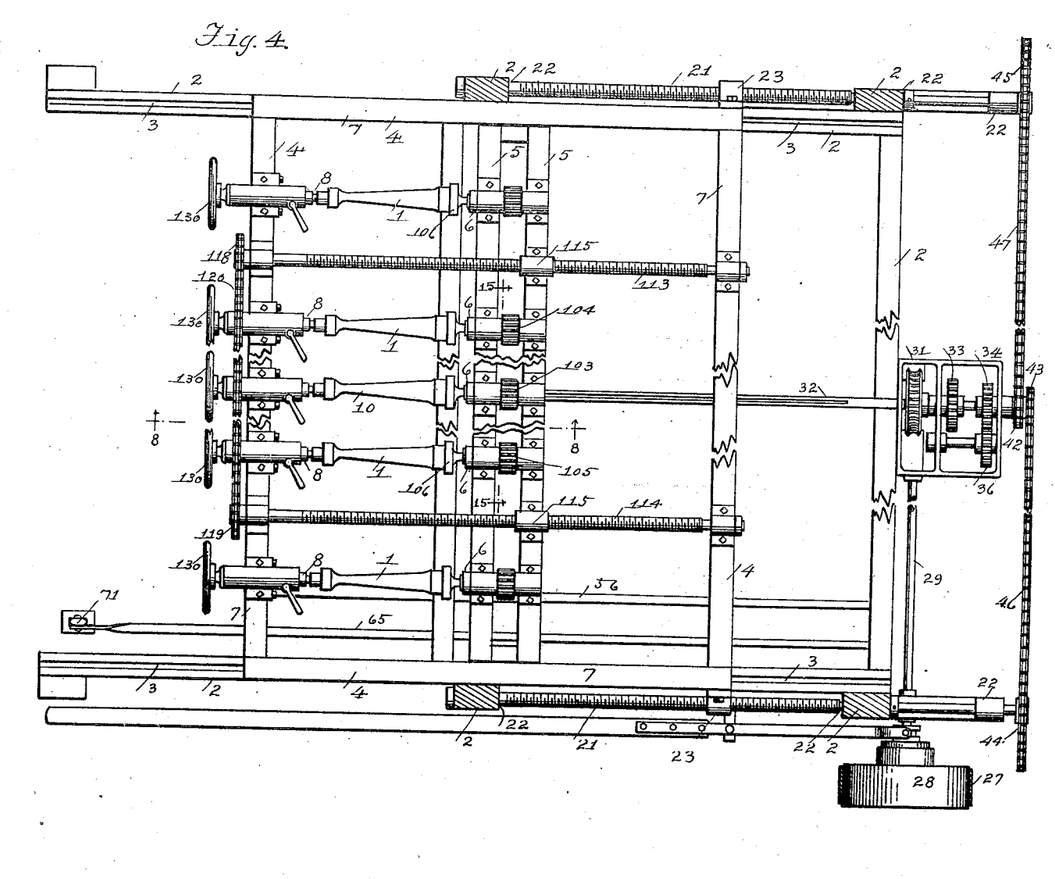
Figure 4 is a longitudinal sectional view of the lathe taken on a horizontal plane corresponding to line 4—4 of Figure 1.
Figure 5:
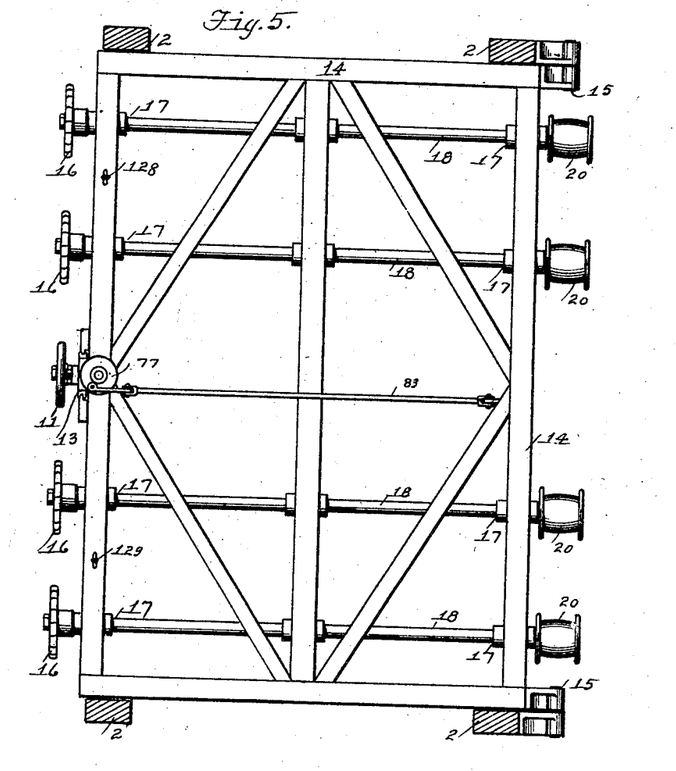
Figure 5 is a like view of certain parts taken on a horizontal plane corresponding to line 5—5 of Figure 1, and showing in plan view the carrier on which the rotary tools are journalled.
Figure 6:
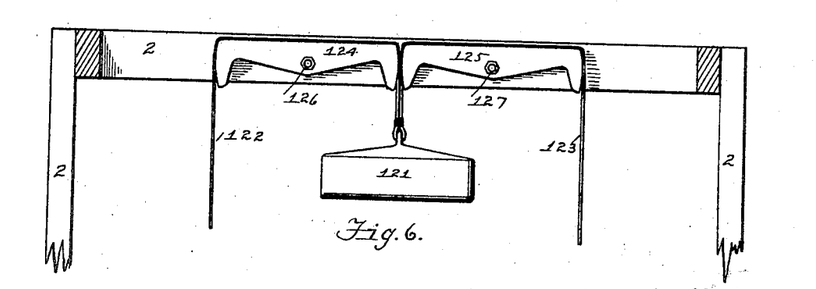
Figure 6 is a sectional view of part of the lathe taken on a vertical plane corresponding to line 6—6 of Figure 1.
Figure 7:
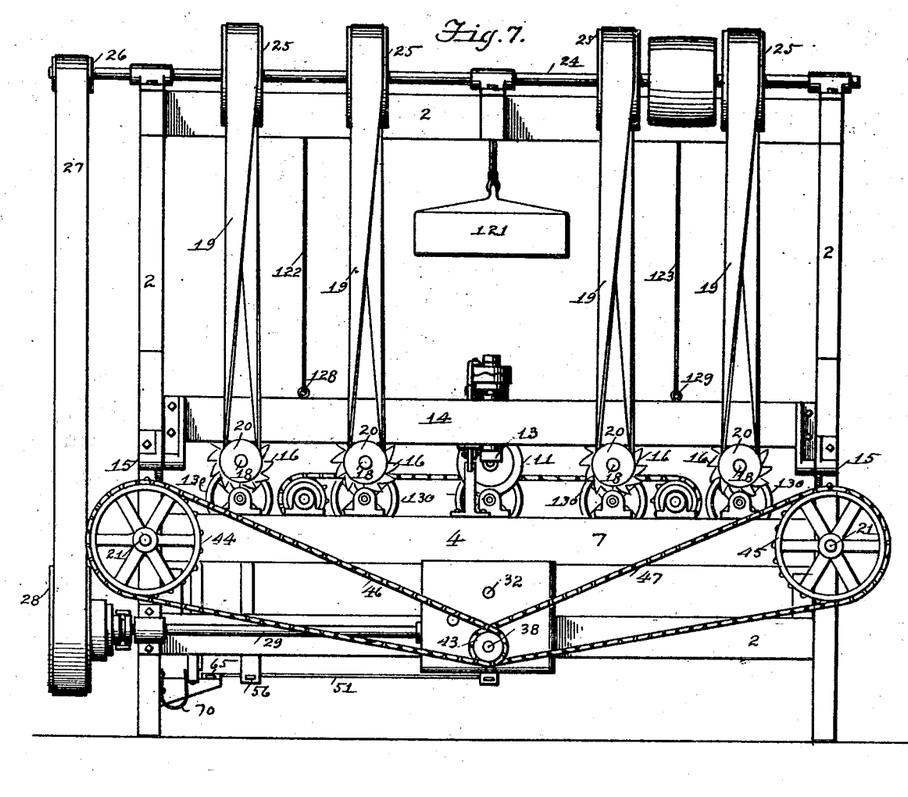
Figure 7 is a rear view of the lathe.

The two portions 5 and 7 of the lathe bed are movable toward and away from each other by the shafts 113, 114, one at either side of the middle head stocks as shown in Figure 4, which shafts are journalled in the portion 7 and threaded in nuts 115 on the portion 5. These shafts are turned simultaneously and at the same speed by the crank 116 (see Figure 3) whose shaft has the sprocket wheel 117 on which and on the shafts' sprocket wheels 118, 119 is carried a chain 120. It will be seen that by this means all of the live head stocks are brought to the same position relatively to their cooperating dead head stocks; and that by disposing the threaded shafts on opposite sides of the center line of the interrelative movement of the lathe bed's two said portions, such portions are kept from binding or sticking on each other in such movement. The carrier is nearly counterbalanced to cause the follower 11 to rest by gravity only heavily enough on the rotating work-pattern 10 to effect the desired operation, by the weight 121 to which are attached the cords 122, 123 which pass over mutually adjacent portions of the members 124, 125 respectively, turnably mounted at 126, 127 on the frame 2, and thence to points of attachment 128, 129 on the carrier adjacent its sides. By this means the sides of the carrier are equally well supported and by a single weight. (See Figure 6.)

The dead head stocks may be severally moved toward and away from their cooperating live head stocks by the usual threaded means turnable by the hand wheels 130.

It will be noted that all the moving parts of the machine are driven from a single source of power.

In Figures 25, 26, 27 and 28 a rotatable tool-carrying head 135 adapted to be used in my lathe is shown. This head has slots 136 therethrough extending from the head's periphery inwardly, and has also recesses 137 in its face disposed parallelly to the slots. The tools 138 have portions 139 slidable in the slots and portions 140 angularly disposed to the portions 139, said portions 140 being slidable in the recesses. The bolts 141 passing through slots 142 in the tools serve to clamp the same on the head in their desired adjusted position in the slots and recesses.

The invention being intended to be pointed out in the claims, is not to be limited to or by details of construction of the particular embodiment thereof illustrated by the drawings or hereinbefore described.

I claim:

1. In a lathe of the character described; a frame; a lathe bed carrying head stocks and having a reciprocating movement on the frame in the head stocks' axial direction; a carrier mounted on the frame and having a movement in a direction transverse to the axis of the head stocks and carrying a rotatable tool and a follower; means for moving the follower relatively to the carrier in a direction transverse to the head stocks' axis and automatically operable at a position of the lathe bed adjacent the end of its movement.

2. In a lathe of the character described; a frame; a lathe bed carrying head stocks and having a reciprocating movement on the frame in the head stocks' axial direction; a carrier mounted on the frame and having a movement in a direction transverse to the axis of the head stocks and carrying a rotatable tool and a follower; means for moving the follower relatively to the carrier in a direction transverse to the head stocks' axis and automatically operable at a position of the lathe bed adjacent the end of its movement; means for adjusting the extent of said movement of the follower.

3. In a lathe of the character described; a frame; a lathe bed carrying head stocks and having a reciprocating movement on the frame in the head stocks' axial direction; a carrier mounted on the frame and having a movement in a direction transverse to the axis of the head stocks and carrying a rotatable tool; a follower movable on the carrier in a direction transverse to the head stocks' axis; a turnable member on the carrier engaging the follower for thus moving the same; means for turning said member, automatically operable at a position of the lathe bed adjacent the end of its movement.

4. In a lathe of the character described; a frame; a lathe bed carrying head stocks and having a reciprocating movement on the frame in the head stocks' axial direction; a carrier mounted on the frame and having a movement in a direction transverse to the axis of the head stocks and carrying a rotatable tool; a follower movable on the carrier in a direction transverse to the head stocks' axis; a turnable member on the carrier screw-threaded in the follower for thus moving the same; means for turning said member, automatically operable at a position of the lathe bed adjacent the end of its movement.

5. In a lathe of the character described; a frame; a lathe bed carrying a plurality of pairs of cooperating head stocks, and having a reciprocating movement on the frame in the head stocks' axial direction; a carrier mounted on the frame and having a movement in a direction transverse to the axes of the head stocks, and carrying a follower and rotatable tools for cutting work pieces held by cooperating pairs respectively of the head stocks; means for simultaneously moving interrelatively and holding the dead head stocks and the live head stocks at a desired axial distance apart.

6. In a lathe of the character described; a frame; a lathe bed having a reciprocating movement on the frame in the head stocks' axial direction and comprising a body portion carrying one of the head stocks; a portion of the lathe bed movable on said body portion in said direction, and carrying the other head stock; rotatable shafts, on opposite sides of the head stocks' axis, and journalled in one portion of the lathe bed and screw-threaded in its other portion, for interrelatively moving and holding the head stocks in desired axial distance apart.

In testimony whereof I have hereunto set my hand at Grand Rapids, Michigan, this 28th day of July, 1920.

JOSEPH F. ROBBIN.